United States Patent
Fong et al.

(10) Patent No.: US 9,236,729 B2
(45) Date of Patent: Jan. 12, 2016

(54) ANTI-ARCING CIRCUIT

(71) Applicant: Microsoft Technology Licensing, LLC, Redmond, WA (US)

(72) Inventors: Chee Kiong Fong, Cupertino, CA (US); Suet Fong Tin, Redmond, WA (US); David Richard Perchilk, Redmond, WA (US); Edward C. Giaimo, III, Bellevue, WA (US); Michael Donovan Rulien, Auburn, WA (US); Perry Samuel Stultz, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/967,600

(22) Filed: Aug. 15, 2013

(65) Prior Publication Data

US 2015/0049402 A1 Feb. 19, 2015

(51) Int. Cl.
  *H02H 9/04* (2006.01)
  *H02H 9/00* (2006.01)
  *H01H 9/54* (2006.01)
  *H02H 11/00* (2006.01)

(52) U.S. Cl.
  CPC ............. *H02H 9/005* (2013.01); *H01H 9/54* (2013.01); *H02H 9/004* (2013.01); *H02H 11/00* (2013.01)

(58) Field of Classification Search
  USPC ......................................................... 361/10
  See application file for complete search history.

(56) References Cited

U.S. PATENT DOCUMENTS

| | | | | |
|---|---|---|---|---|
| 5,619,105 A * | 4/1997 | Holmquest | ................... | 315/225 |
| 6,128,169 A | 10/2000 | Neiger et al. | | |
| 6,211,649 B1 * | 4/2001 | Matsuda | ................... | 320/115 |
| 6,507,172 B2 * | 1/2003 | Sherman | ................... | 320/134 |
| 6,861,824 B1 * | 3/2005 | Liu et al. | ................... | 320/164 |
| 8,375,234 B2 * | 2/2013 | Schramm et al. | ............. | 713/324 |
| 8,443,130 B2 * | 5/2013 | Xie et al. | ................... | 710/313 |
| 8,541,984 B2 * | 9/2013 | Hsu et al. | ................... | 320/138 |
| 8,566,575 B2 * | 10/2013 | Chan et al. | ................... | 713/2 |
| 8,723,476 B2 * | 5/2014 | Helfrich | ................... | 320/106 |
| 8,878,602 B1 * | 11/2014 | Hsu et al. | ................... | 327/553 |

(Continued)

OTHER PUBLICATIONS

Swingler, et al., "Micro-Arcing and Arc Erosion Minimization Using a DC Hybrid Switching Device", In IEEE Transactions on Components and Packaging Technologies, vol. 31, Issue 2, Jun. 2008, pp. 6.

(Continued)

*Primary Examiner* — Thienvu Tran
*Assistant Examiner* — Angela Brooks
(74) *Attorney, Agent, or Firm* — Jeremy Snodgrass; Judy Yee; Micky Minhas (57) ABSTRACT

Anti-arcing circuits are described herein that are configured to prevent or substantially mitigate arcing when a power adapter is connected/disconnected from a client device. The anti-arcing circuit restricts power supplied when a connection of a connector of a power adapter to the adapter interface is not fully established. The anti-arcing circuit is further configured to detect when a connection is made and remove the restriction to supply power for operations of the client device. In one approach, the anti-arcing circuit includes two different paths and components associated with a detection mode and operational mode respectively. In the detection mode, power supply is suppressed and a current pulse may be sent to determine if a connection is established. If current is detected, a switch is made to operational mode and power for normal device operations is supplied.

20 Claims, 8 Drawing Sheets

(56) References Cited

U.S. PATENT DOCUMENTS

| | | | |
|---|---|---|---|
| 8,892,912 B2* | 11/2014 | Lai et al. | 713/300 |
| 9,036,315 B2* | 5/2015 | Johnson, Jr. | 361/93.9 |
| 2003/0054683 A1 | 3/2003 | Bryan et al. | |
| 2004/0230401 A1* | 11/2004 | Duren et al. | 702/184 |
| 2005/0157443 A1 | 7/2005 | Bryan et al. | |
| 2007/0029943 A1* | 2/2007 | Erhardt et al. | 315/209 R |
| 2007/0159136 A1* | 7/2007 | Culbert et al. | 320/128 |
| 2008/0231235 A1* | 9/2008 | Thijssen | 320/138 |
| 2008/0259514 A1 | 10/2008 | Cagno et al. | |
| 2009/0177906 A1* | 7/2009 | Paniagua et al. | 713/340 |
| 2010/0219790 A1* | 9/2010 | Chadbourne et al. | 320/107 |
| 2010/0320971 A1* | 12/2010 | Zhu et al. | 320/134 |
| 2011/0122663 A1 | 5/2011 | Huang | |
| 2011/0162053 A1 | 6/2011 | Pei et al. | |
| 2012/0050928 A1* | 3/2012 | Johnson, Jr. | 361/58 |
| 2012/0071215 A1* | 3/2012 | Bourque et al. | 455/573 |
| 2013/0075531 A1 | 3/2013 | Jiao et al. | |
| 2013/0162053 A1 | 6/2013 | Iizuka et al. | |
| 2013/0286522 A1* | 10/2013 | Mullins et al. | 361/58 |
| 2013/0286823 A1* | 10/2013 | Taylor et al. | 370/228 |
| 2014/0268556 A1* | 9/2014 | Lam et al. | 361/679.55 |

OTHER PUBLICATIONS

Singh, et al., "Predicting Arcing in Power Supplies", In Sixteenth Annual IEEE Applied Power Electronics Conference and Exposition, vol. 1, Mar. 4, 2001, pp. 5.

Razafiarivelo, et al., "Evaluation of Arcing Damage on Connector for 42 V Automotive Power Net", In Proceedings of the 50th IEEE Holm Conference on Electrical Contacts and the 22nd International Conference on Electrical Contacts, Sep. 20, 2004, pp. 7.

"International Search Report and Written Opinion", Application No. PCT/US2014/050795, Nov. 27, 2014, 10 Pages.

"Second Written Opinion", Application No. PCT/US2014/050795, Jun. 30, 2015, 4 pages.

* cited by examiner

ANTI-ARCING CIRCUIT

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. One challenge that faces developers of mobile computing devices is efficient power management and extension of battery life. For instance, the small form factor of many mobile computing devices may compel designs in which power connections are kept relatively small in size. Accordingly, developers may be further concerned with ensuring that adapters designed for use with such small form power connections are safe and supply the proper amount of power to the device. One concern is arcing that may occur when an external power adapter device is connected to a mobile computing device.

SUMMARY

Anti-arcing circuits are described herein that are configured to prevent or substantially mitigate arcing when a power adapter is connected/disconnected from a client device. In one or more implementation, the anti-arcing circuit is provided to restrict power supplied via the power adapter from a power source to the client device when a connection of the connector to the adapter interface is not fully established. The anti-arcing circuit is further configured to detect when the connection is made and remove the restriction to supply an appropriate power level for operations of the client device. In one approach, the anti-arcing circuit includes two different paths and components associated with a detection mode and operational mode, respectively. In the detection mode, power supply is suppressed and a current pulse may be sent to determine if a connection is established. If current is detected, a switch is made to operational mode and power for normal device operations is supplied. In this way, the device does not receive power sufficient to sustain arcing until the connection of the connector is fully established and therefore arcing may be mitigated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Anti-arcing circuits are described herein that are configured to prevent or substantially mitigate arcing when a power adapter is connected/disconnected from a client device. In the absence of the anti-arcing circuit, arcing may occur across a connector and the adapter interface as the connection is being established (or during disconnection). This may reduce the life span of connector pins/contacts, may present a hazard in some settings, and/or may make user uncomfortable if they see the arcing. In one or more implementation, the anti-arcing circuit is provided to restrict power supplied via the power adapter from the power source to the client device when a connection of the connector to the adapter interface is not fully established. The anti-arcing circuit is further configured to detect when the connection is made and remove the restriction to supply an appropriate power level for operations of the client device. In one approach, the anti-arcing circuit includes two different paths and components associated with a detection mode and an operational mode, respectively. In the detection mode, power supply is suppressed and a current pulse may be sent to determine if a connection is established. If current is detected, a switch is made to the operational mode and power for normal device operations is supplied. In this way, the device does not receive power sufficient to sustain arcing until the connection of the connector is fully established and therefore arcing may be mitigated.

In the following discussion, an example operating environment is first described that may employ the techniques described herein. Next, example details and techniques are described which may be implemented in the example environment as well as other environments. Consequently, performance of the techniques is not limited to the example environment and the example environment is not limited to performance of the example techniques. Lastly, example systems and devices are described that may be employed to implement one or more embodiments.

Example Operating Environment

Figure 1:
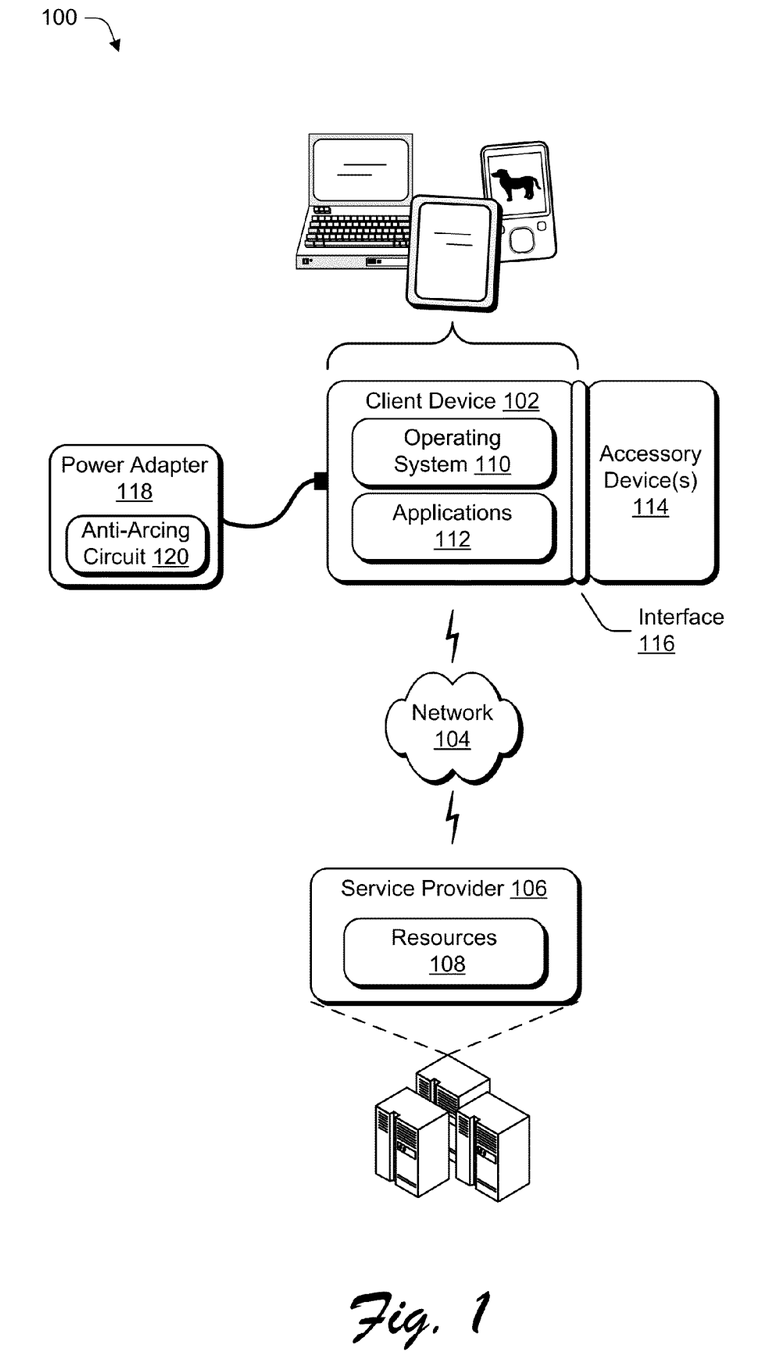
FIG. 1 is an illustration of an environment in accordance with one or more implementations.

FIG. 1 is an illustration of an environment 100 in an example implementation that is operable to employ techniques described herein. The illustrated environment 100 includes a client device 102 that is communicatively coupled via a network 104 to a service provider 106. The service provider 106 may be configured to make various resources 108 (e.g. content and services) available over the network 104 to the client device 102 and other clients. Generally, resources 108 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources. Content may include various combinations of text, multi-media streams, documents, application files, photos, audio/video files animations, images, web pages, web applications, device applications, content for display by a browser or other client application, and the like.

The client device 102 and service provider 106 may be implemented by one or more computing devices and also may be representative of one or more entities. A computing device may be configured in a variety of ways. For example, a computing device may be configured as a computer that is capable of communicating over the network, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by the service provider 106.

The client device 102 is further illustrated as including an operating system 110. The operating system 110 is configured to abstract underlying functionality of underlying hardware to applications 112 that are executable on the client device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device without understanding how this rendering will be performed. Additionally, the computing device 102 may be physically and communicatively coupled to an accessory device 114 via an interface 116. Details regarding various example accessory devices and interfaces are discussed below in relation to FIG. 2.

In accordance with techniques described herein, the client device 102 is also illustrated as being connectable to a power adapter 118 (also referred to herein as a power supply unit (PSU)) that includes or makes use of an anti-arcing circuit 120 as described herein to prevent arcing. In particular, the anti-arcing circuit 120 may be implemented in various ways to mitigate arcing that may otherwise occur when the client device 102 is connected to a power supply via the power adapter 118. The power adapter 118 is representative of an external power supply unit that is connectable to the client device 102 a suitable power source such as an electrical wall receptacle, a battery, or other power source. In one approach, the anti-arcing circuit 120 is configured to implement a detection mode that initially restricts power to control arcing prior to connection to the client device. The anti-arcing circuit 120 may subsequently cause a switch to an operational mode for "normal" operations responsive to detection of a connection of the client device to the power adapter 118. Upon disconnection of the power adapter 118 from the client device 102, the anti-arcing circuit 120 may revert back to the detection mode with restricted power. Details regarding techniques to selectively switch between the modes to prevent arcing are discussed in relation to the following figures.

Figure 2:
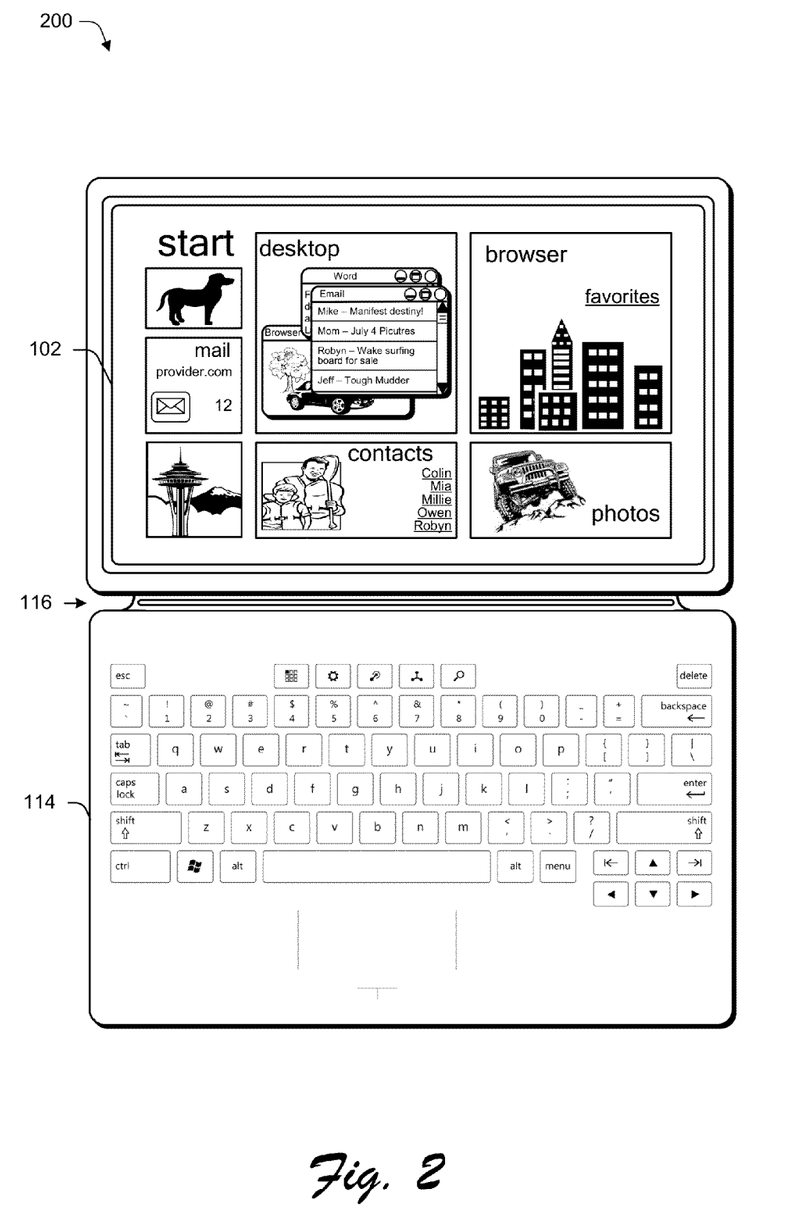
FIG. 2 is an illustration of an example client device in accordance with one or more implementations.

FIG. 2 depicts generally at 200 one illustrative example of an accessory device 114 that is connectable to a client device 102 via an interface 116. In the example, the client device 102 is depicted as a tablet or slate device. The example accessory device 114 is configured as a keyboard having a QWERTY arrangement of keys although other arrangements of keys are also contemplated. Further, other non-conventional configurations for an accessory device 114 are also contemplated, such as a game controller, configuration to mimic a musical instrument, a power adapter, and so forth. Thus, the accessory device 114 may assume a variety of different configurations to support a variety of different functionality. Different accessory devices may be connected to the computing device at different times.

As previously described, the accessory device 114 is physically and communicatively coupled to the client device 102 via an interface 116, which in this example is configured as a flexible hinge. The flexible hinge represents one illustrative example of an interface 116 that is suitable to connect and/or attach an accessory device 114 to a client device 102. The flexible hinge is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device in relation to the client device. This may be used to support consistent alignment of the accessory device in relation to the client device 102, such as to align sensors used to change power states, application states, and so on.

The flexible hinge may be formed using one or more layers of fabric and include conductors formed as flexible traces to communicatively couple the accessory device to the client device and vice versa. This communication, for instance, may be used to communicate a result of a key press to the client device, receive power from the client device, perform authentication, provide supplemental power to the computing device, and so on. The flexible hinge or other suitable interface 116 may be configured in a variety of ways to support multiple different accessory devices 114. Generally, the interface 116 supports movement of the accessory device 114 in relation to the client device 102 into various orientations/configurations. For instance, example keyboard accessory may be rotated against the display device of the client device 102 and thereby act as a cover. An accessory may also be rotated so as to be disposed against a back of the client device 102, e.g., against a rear housing of the client device 102 that is disposed opposite the display device for a viewing orientations. In another instance, a typing arrangement may be supported in which the accessory is laid flat against a surface and the client device 102 is disposed at an angle to permit viewing of the display device 110, e.g., such as through use of a kickstand disposed on a rear surface of the computing device 102. Other instances are also contemplated, such as a tripod arrangement, meeting arrangement, presentation arrangement, and so forth.

Having considered the foregoing discussion of an example operating environment, consider now details regarding a verification platform described in relation to the following example illustrations and procedures.

Anti-Arcing Details

This section discusses details of example anti-arcing circuits and techniques in accordance with one or more implementations. In portions of the following discussion reference may be made to the example operating environment described in relation to FIGS. 1 and 2.

Figure 3:
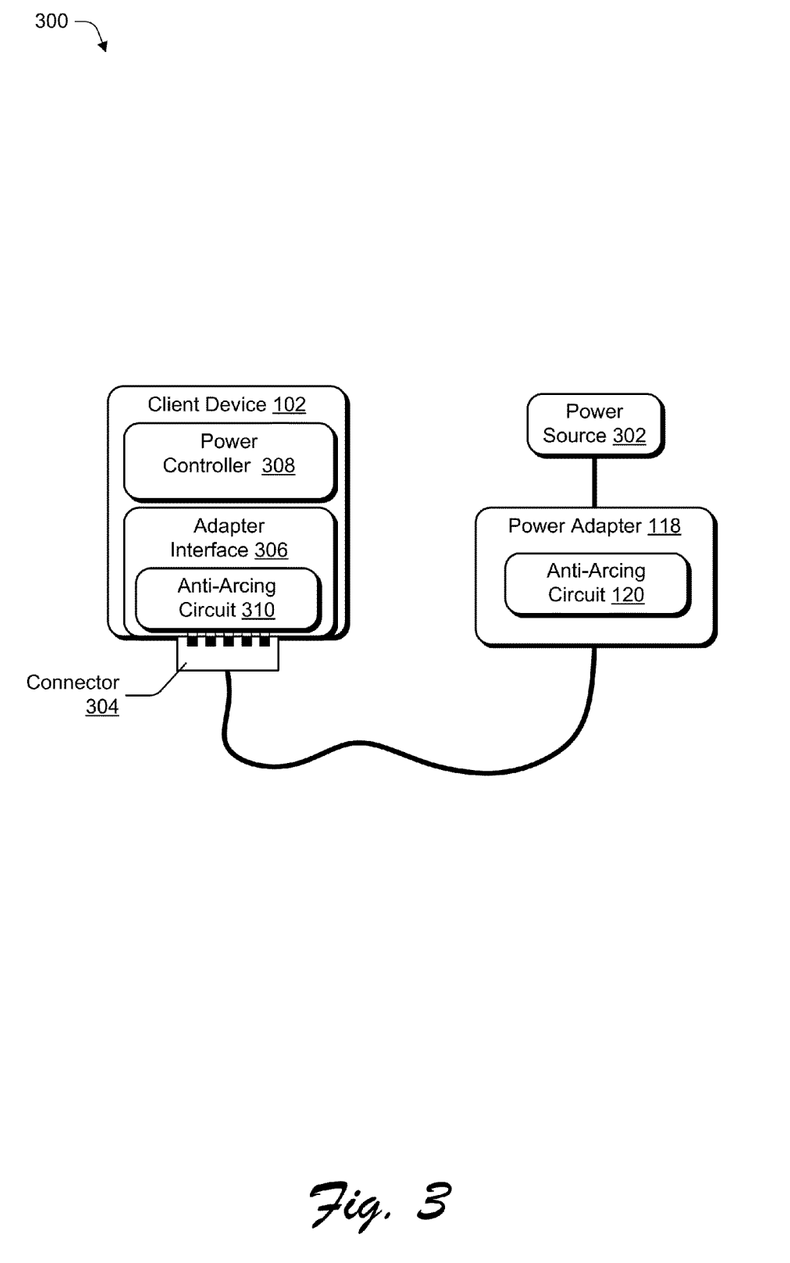
FIG. 3 is a diagram depicting details of an example power adapter in accordance with one or more implementations.

In particular, FIG. 3 depicts generally at 300 an example power adapter 118 that is connectable to a client device 102 in greater detail. As shown, the power adapter 118 provides the client device 102 with a connection to a power source 302 (e.g., a power receptacle, external battery, etc.). To do so, the power adapter 118 may include a connector 304 that is configured to connect to a corresponding an adapter interface 306 of the client device 102 to facilitate communication and power exchanges between the adapter and device. The power adapter may also include components and/or another connector to enable the connection to the power source 302. Thus, the connection of the connector 304 and adapter interface 306 provides both a power coupling for supplying power from the adapter to the device and a communicative coupling to carry communications between the adapter and device.

The connector 304 and adapter interface 306 may be configured in various ways to establish a suitable connection between the device and adapter. By way of example and not limitation, the example connector 304 of FIG. 3 is depicted as having five pins that create a connection by contact with five corresponding pins of the adapter interface 306. In this arrangement, two pins of the connection may be used for positive voltage, another two pins may be used for voltage return, and the remaining pin of the connection may establish a single pin communication line/channel used to convey communications between the adapter and device. A variety of other arrangements are also contemplated.

In the depicted example, the power adapter 118 is further illustrated as including an anti-arcing circuit 120. The anti-arcing circuit 120 may be configured in various was described herein to prevent or substantially mitigate arcing when the power adapter 118 is connected/disconnected from the client device 102. In the absence of the anti-arcing circuit 120, arcing may occur across the connector 304 and the adapter interface 306 as the connection is being established (or during disconnection). This may reduce the life span of connector pins/contacts, may present a hazard in some settings, and/or may make users uncomfortable if they see the arcing. Accordingly, the anti-arcing circuit 120 is provided to restrict power supplied via the power adapter 118 from the power source 302 to the client device 102 when a connection of the connector 304 to the adapter interface is not fully established. The anti-arcing circuit 120 is further configured to detect when the connection is made and remove the restriction to supply an appropriate power level for operations of the client device 102.

As further illustrated, the client device 102 may include a power controller 308 that represents functionality of the client device to perform various operations for power management. This may include management of different power sources and switching between the sources, implementing a defined and/or selected power management scheme, managing battery life, and so forth. The power controller 308 may also facilitate connections and communications with a power adapter 118 configured to supply power to the device via a suitable power source 302, such as a wall socket, external battery, or other external source of power. The power controller 308 may be implemented in hardware, software, firmware and/or combinations thereof. By way of example and not limitation, a microcontroller or other suitable hardware logic device may be configured to implement various functionally that is described herein in relation to power controller 308. The power controller 308 may operate using relatively low power, independently of operating a "primary" processing system (for example, one or more central processing units of the device) of the host computing device, and/or without booting/ executing an operating system or using other device components and applications. In other words, the power controller 308 may operate to perform some power management tasks without having to operate or supply power to the processing system and other device components (e.g., device memory, network interface, display device, etc.) and/or without completely starting-up or waking-up the computing device.

In an implementation, an anti-arcing circuit 310 as represented in FIG. 3 may be included with the client device 102 in addition to or in lieu of providing the anti-arcing circuit 120 as a component of the power adapter 118. As shown, the anti-arcing circuit 310 may be implemented as a component of the adapter interface 306. Alternatively the anti-arcing circuit 310 may be implemented as a component of the power controller, as a standalone device, or otherwise be integrated with the client device 102. In this approach, the anti-arcing circuit 310 may operate to restrict/suppress power across the connection of the adapter interface 306 and connector 304 in the absence of detecting a complete connection. The anti-arcing circuit 310 may then detect when the connection is made and enable an appropriate power level for operations of the client device. To do so, the anti-arcing circuit 310 may communicate instructions, notifications, or other suitable directives to the power adapter 118 to cause the power adapter to switch between providing restricted power and normal power levels in appropriate circumstances. Notably, the anti-arcing circuit 310 may operate without having or relying upon dedicated pins of the connector 304 that are used strictly for sensing connections and/or arcing mitigation. Instead, the connector 304 may be used without modification and is arranged with pins used for other, normal functions, such as the five pins in the example described above.

To further illustrate, consider now a discussion of some example procedures and anti-arcing circuits. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices of FIGS. 2 and 3, respectively.

Figure 4:
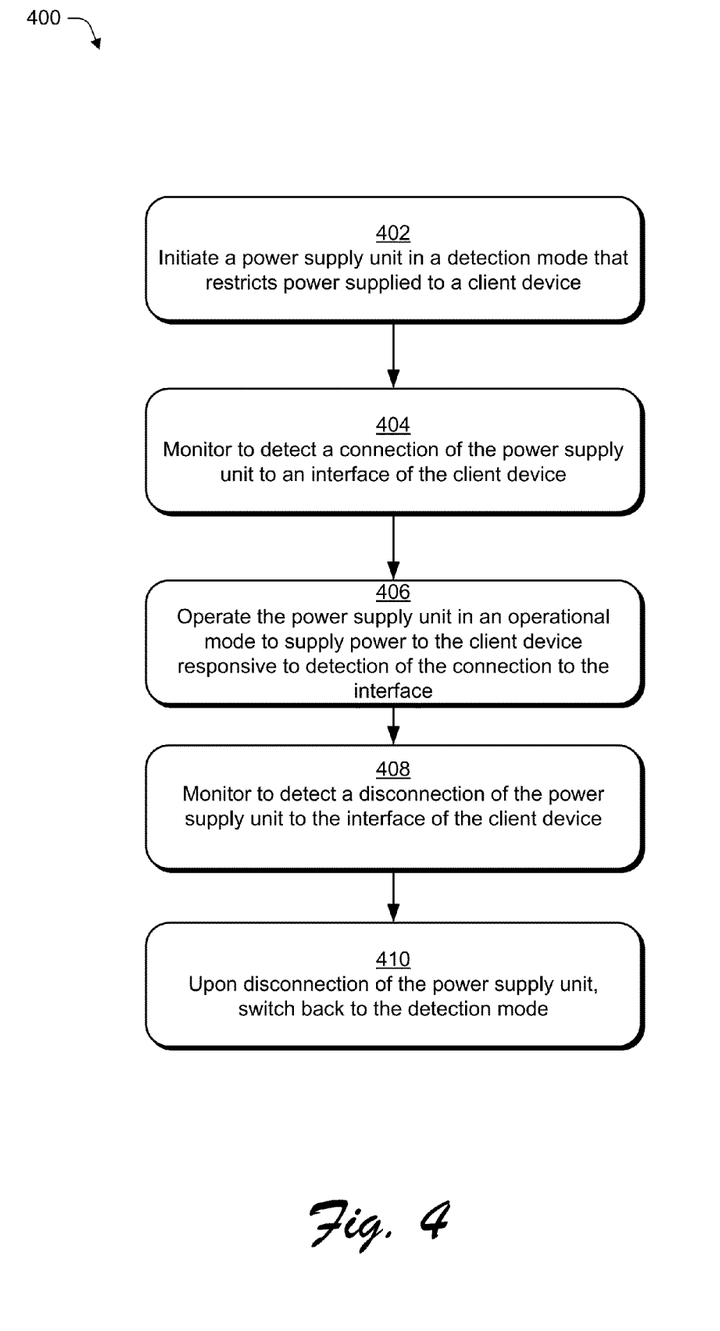
FIG. 4 is a flow diagram depicting an example procedure in which a power adapter switches between modes.

FIG. 4 depicts an example procedure 400 to selectively switch between different modes to prevent arcing. A power supply unit is initiated in a detection mode that restricts power supplied to a client device (block 402). Then, monitoring is performed to detect a connection of the power supply unit to an interface of the client device (block 404). For example, an anti-arcing circuit 120 of a power adapter 118 may be set to operate in a detection mode by default. This may occur when the power adapter 118 is initially connected to a power source 302. In the detection mode, the anti-arcing circuit 120 is configured to supply restricted power output so that arcing does not occur when a connection of the adapter to a client device is being established. Further, the anti-arcing circuit 120 is configured to monitor to determine when a connection is established to a client device 102. In one approach, the anti-arcing circuit 120 may include detection components to implement the monitoring. This may include a monitoring integrated circuit, a microcontroller device, and/or other hardware suitable to check the connection between the connector 304 and adapter interface 306 and recognize when the connector 304 is connected and disconnected to a corresponding client device 102. By way of example and not limitation, the anti-arcing circuit 120 may be configured to recognize changes in electrical current indicative of whether or not the power adapter is connected. Other techniques to recognize when a connector is connected or disconnected are also contemplated, including but not limited to processing notifications or other feedback sent by a power controller of 308 of the computing device, detecting actuation of a physical switch or button that is toggled into different states as the connector is connected/disconnected, using one or more sensors configured to provide information indicative of connection/disconnection such as a light sensor or IR sensor, and so forth.

Responsive to detection of the connection to the interface, the power supply unit is operated in an operational mode to supply power to the client device (406). In the operational mode, monitoring is performed to detect a disconnection of the power supply unit to the interface of the client device (block 408). Upon disconnection of the power supply unit, the power supply unit is switched back to the detection mode (block 410).

Here, the anti-arcing circuit 120 may operate to cause a switch from limited/restricted power to an appropriate power supply for normal operations of the device. The power supply in the operational mode is set to a designated level for the device and is relatively higher than power in the detection mode. Since the power level associated with the operational mode is not available until a connection is detected, arcing while the connection is being established can be avoided. While in the operational mode, the detection components of the anti-arcing circuit 120 may perform monitoring to determine when the power adapter 118 is disconnected. When the disconnection is recognized, the anti-arcing circuit 120 may cause a switch back to the detection mode and restricted power supply. In this way, the power adapter 118 is prepared for mitigation of arcing in relation to a subsequent connection to a client device.

An anti-arcing circuit 120 may be configured is various ways to implement the monitoring and selective switching in response to connection and disconnection of a power supply unit to a device. In general, the anti-arcing circuit 120 includes at least a detection component to monitor connection status to a device, switching components operable to change between restricted and operational power levels, and a control mechanism to cause operation of the switching components in response to changes in the connection status determined via the detection component. One example arrangement of a suitable anti-arcing circuit 120 is described in relation to an example circuit of FIGS. 5 and 6 and a corresponding flow diagram of FIG. 7.

Figure 5:
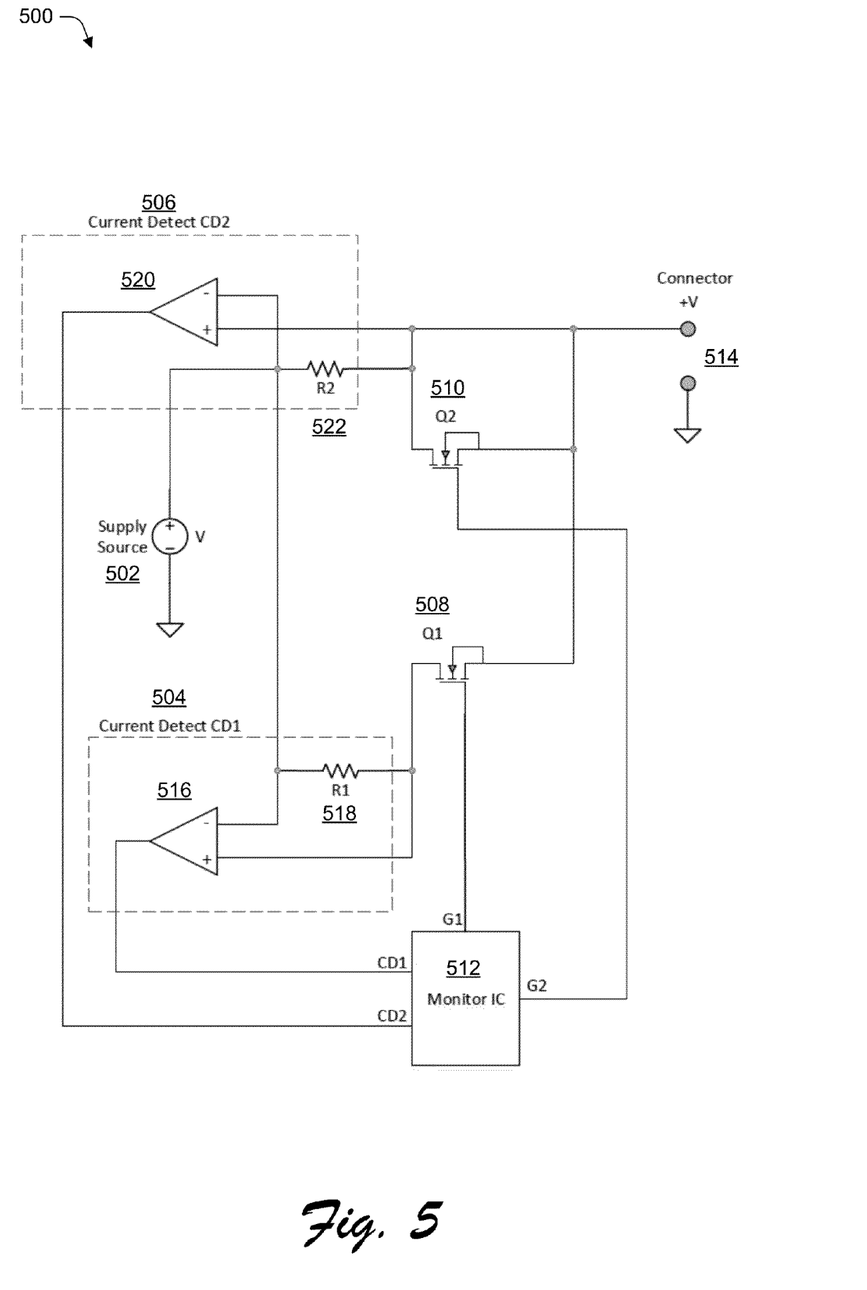
FIG. 5 is diagram depicting an example anti-arcing circuit.

In particular, FIG. 5 depicts an example implementation of an anti-arcing circuit 120 circuit, generally at 500. The example arrangement depicted in FIG. 5A includes a supply source 502, two current detectors, CD1 504 and CD2 506, two metal-oxide-semiconductor field-effect transistors (MOSFETs) Q1 508 and Q2 510, a monitor integrated circuit 512, and a connector 514. These components form different respective current paths with the connector that are associated with the detection mode and the operational mode. The supply source 502 may represent a connection to a power source to power a client device, such as an AC to DC convertor, a DC to DC convertor, an external battery pack, and so forth. The monitor integrated circuit 512 represents functionality and/or logic implemented in a hardware form for monitoring the connection of the connector 514 and switching between the detection mode and operational mode described herein. The connector 514 represents a connector configured to connect the anti-arcing circuit and/or power supply unit/power adapter to the device, such as the example connector 304 described in relation to FIG. 3. As those of skill in the art will appreciate, the MOSFETs are a type of transistor used in digital and analog circuits for various functionality, such as switching and amplifying. In the context of an anti-arcing circuit, the MOSFETs may provide switching functionality to selectively restrict current or supply current in appropriate scenarios. Other types of transistors, switches, and components may be employed in addition to or in lieu of the MOSFETs to accomplish comparable switching functionality.

The current detectors CD1 504 and CD2 506 are each connected in series between the supply source positive output and a drain of a corresponding MOSFET. The outputs of the current detectors are connected to the respective inputs (labeled CD1 and CD2) associated with the monitor integrated circuit 512. The source of each MOSFET is connected to the positive terminal of the connector 514. The gates of the MOSFETs are connected to respective outputs (labeled G1 and G2) of the monitor integrated circuit 512. A first current path between the source and connector for a detection mode is established by CD1 504 and Q1 508. A second current path for the operational mode is established by CD2 506 and Q2 510. Both paths include the monitor integrated circuit 512. The first current path may be associated with suppressed power and the second current path may be associated with unrestricted power for normal device operations. A switch between the paths may be effectuated by selectively turning on and off the MOSFETS (Q1, Q2) in the paths. Thus, the first current path is selected when Q1 is on and disabled when Q1 is off. Likewise, the second current path is selected when Q2 is turned on and disabled when Q2 is off.

In an implementation, the current detectors include respective comparators and resistors. In particular, FIG. 5 depicts CD1 504 as including a comparator 516 and a resistor R1 518. Likewise, CD2 506 is depicted as including a comparator 520 and a resistor R2 522. As shown in FIG. 5, a negative input terminal of each comparator 516, 520 is connected to a respective one of the resistors 518, 522. A junction of this connection is connected to the supply source positive output. The positive input terminal of each comparator is connected to the other end of the respective resistor. Further, the junction of this connection is connected to the drain of a corresponding MOSFET. The output sides of the comparators 516, 520 are connected to corresponding inputs (labeled CD1 and CD2) of the monitor integrated circuit 512. In this arrangement, when current flows through either R1 518 or R2 522, the output of the respective comparator will go high because of a voltage drop across the resistor in the particular path.

Figure 6:
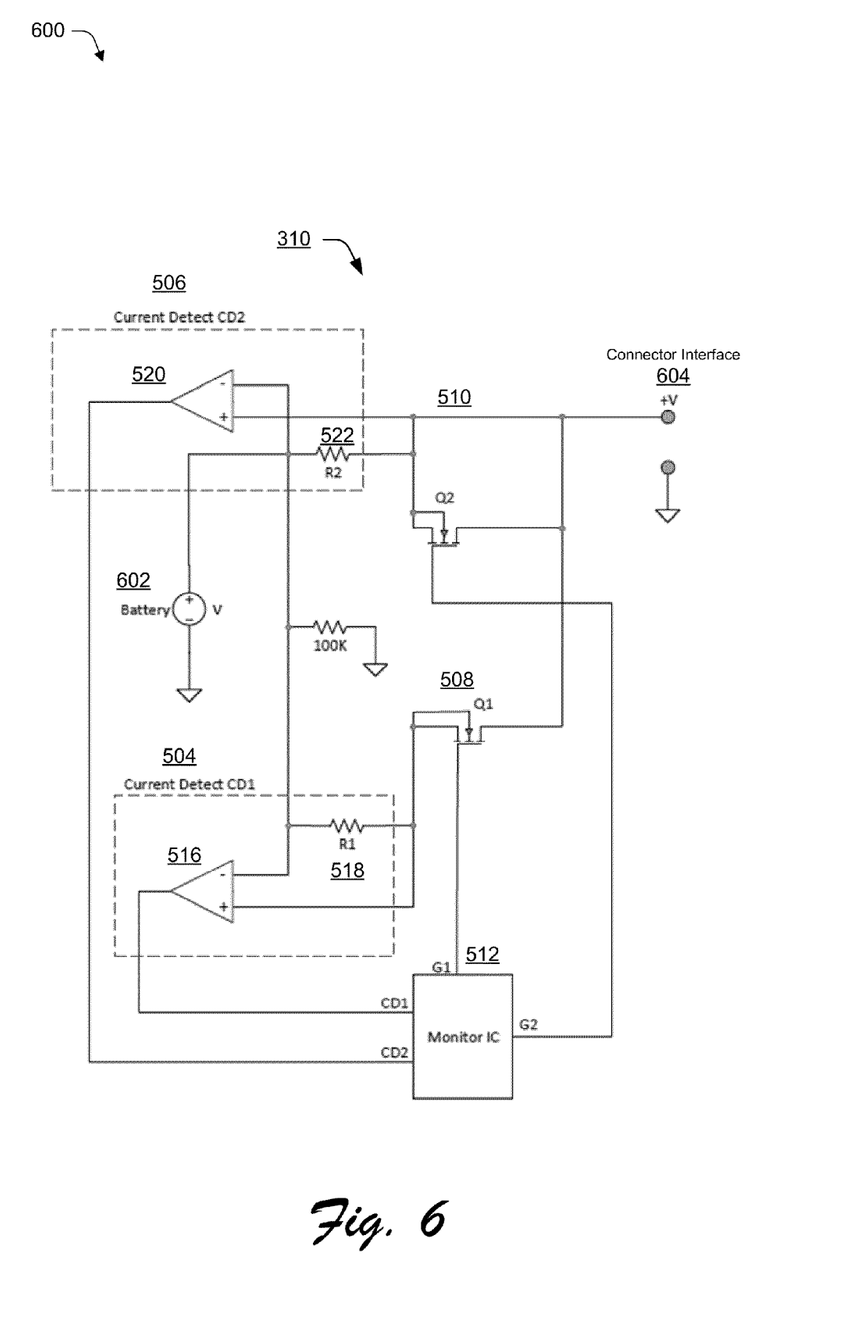
FIG. 6 is diagram depicting another example anti-arcing circuit.

FIG. 6 depicts details of another example anti-arcing circuit 310 that may be integrated with a client device as previously mentioned. The anti-arcing circuit operates in a comparable manner as the example circuit of FIG. 5 but is implemented on the device side rather than as part of the power adapter 118. The example arrangement depicted in FIG. 6 again includes two current detectors, CD1 504 and CD2 506, two metal-oxide-semiconductor field-effect transistors (MOSFETs) Q1 508 and Q2 510, and a monitor integrated circuit 512. In this case however, the anti-arcing circuit 310 is shown as being arranged between a battery 602 of a client device 102 and a connector interface 604 that enables connection to a power adapter 118, e.g., on the device side. Again, these components form different respective current paths with the connector interface that are associated with the detection mode and the operational mode. Details regarding operation of the example circuits are now discussed in relation to FIG. 7.

Figure 7:
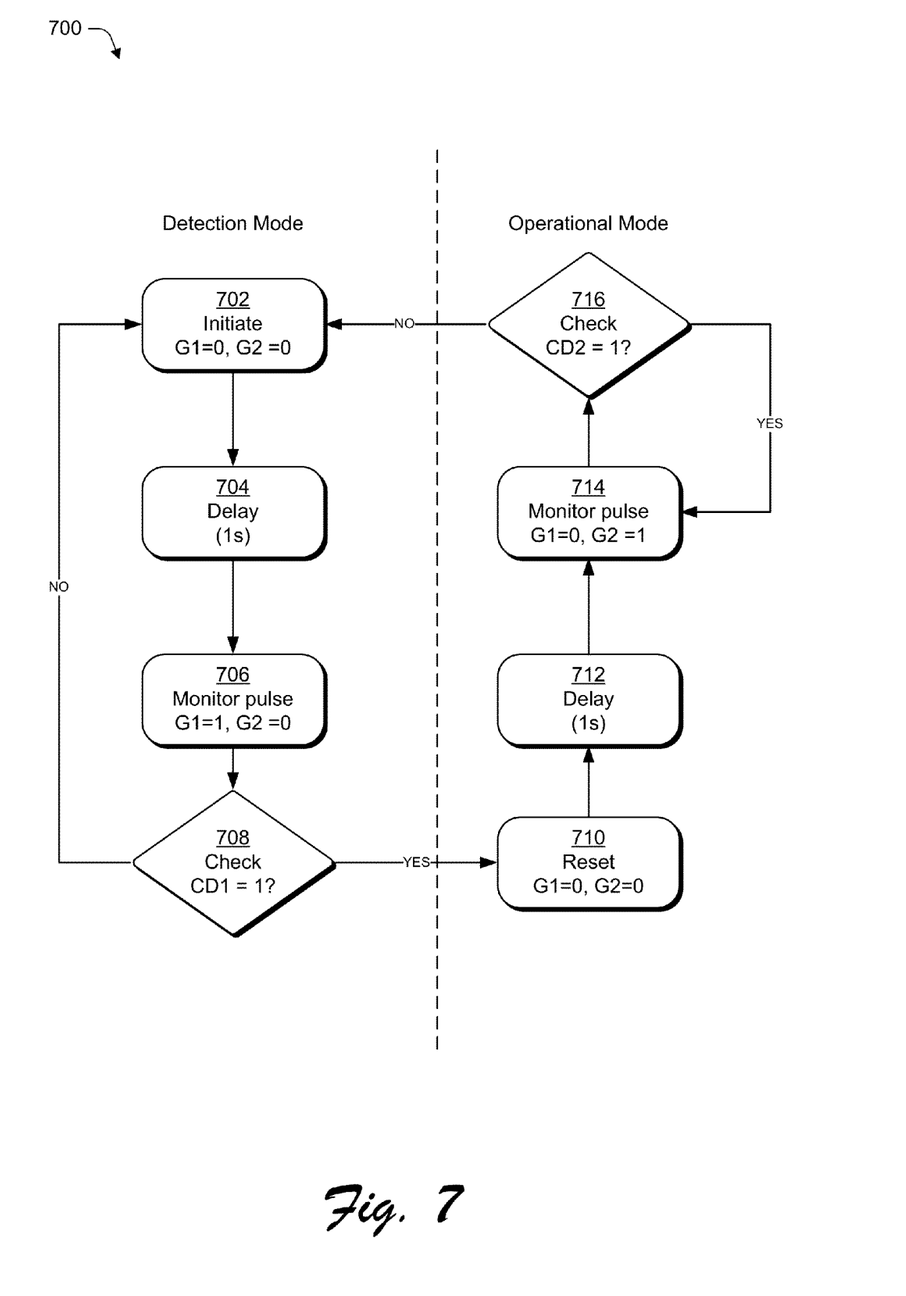
FIG. 7 is a flow diagram depicting an example procedure for operation of an anti-arcing circuit.

FIG. 7 depicts an example procedure 700 that represent operations and/or logic that may be implemented by anti-arcing circuit in accordance with one or more embodiments. The procedure may be performed at least partially in hardware such as by a monitor integrated circuit 512 of the example circuit in FIG. 5, a microcontroller, a power controller device of a client, and so forth. The procedure may also be performed by other hardware elements, logic devices, firmware, or combinations thereof. FIG. 7 also represents a logical division of operations between a detection mode and an operational mode as described herein. This division is represented by way of a dashed vertical line between the various blocks.

When the power adapter is plugged in and/or turned on, a corresponding anti-arcing circuit may be initialized in a detection mode as discussed previously. The anti-arcing circuit may be incorporated with a power adapter 118. In some implementations, though an anti-arcing circuit may be provided as a component of the computing device such as being integrated with a power controller 308 or an adapter interface 306 as discussed in relation to FIG. 3. Thus, although procedure 700 is discussed in relation to the example circuit of FIG. 5, comparable logic and techniques may be applied to other circuits arrangements and/or to anti-arcing circuits incorporated with a power adapter, client device as in FIG. 6, or otherwise.

Initially, the anti-arcing circuit may be initialized in the detection mode (block 702). In relation to the example circuit of FIG. 5 for example, the monitor integrated circuit may be set to start in detection mode when plugged in and/or before a connection to a device is established. For this initialization stage, both MOSFETs (Q1 and Q2) are turned off. In other words, the outputs of the monitor integrated circuit are set to zero (e.g., G1=0, G2=0).

A delay is then applied (block 704). The delay may be configured as a relatively brief delay such as few seconds or a fraction of a second. This delay period provides time between checks and an interval in which a connection of the power adapter may occur. The delay may be set to control the frequency of monitoring for connection/disconnection. In the depicted example a delay of one second is shown although other delay periods are also contemplated.

After the appropriate delay, a monitor pulse is sent to enable current detection (block 706). In the detection mode, the supply to the device is flowing through CD1 504 and the corresponding resistor R1 518. Here, sending the monitor pulse involves turning on the MOFSET Q1 508 (e.g., G1=1, G2=0) so that current may be detected in the loop through CD1 504 and R1 518. The pulse may be a relatively narrow pulse on the order of a few milliseconds.

After the monitor pulse is sent, a check for current through the circuit is made (block 708). In relation to the example circuit of FIG. 5, this involves checking the output of the comparator 516. In other words, a determination is made regarding whether the output of the comparator 516 is high (CD1=1) or low (CD1=0). As mentioned if current is flowing across R1 518, CD1 is driven high. On the other hand, if the connector is not connected, then CD1 is low. Thus, the monitor integrated circuit is configured to check the output of the comparator 516 and take appropriate action in response.

In particular, if the output is low (CD1=0) this indicates that a connection has not been established. Accordingly, the circuit stays in detection mode and the procedure returns to block 702. While still in the detection mode, restricted power is supplied to suppress arcing and blocks 702 to 708 may then be repeated one or more times to monitor and detect connections to a device in the described manner.

On the other hand, if the output is high (CD1=1) this indicates that a connection has been established and current is flowing across R1 518. In response, the monitor integrated circuit 512 may cause as switch to the operational mode. In general, this involves switching the current path between the MOFSETs, such as by shutting off Q1 508 and turning on Q2 510. By so doing, the circuit may switch to supplying power to the device through CD2 506 and the corresponding resistor R2 522. The power supply in operational mode is relatively higher than in detection mode due to lower resistance selected for R1 522 in comparison with R1 518 as discussed in greater detail below. Thus, the power supplied in operational mode is sufficient to support normal operation of the device. The anti-arcing circuit may then be reset to monitor for disconnection and switch back from the operational mode to the detection mode if appropriate. The monitoring that occurs in the operational mode is similar to the monitoring just described, but is applied to the components associated with a current path through CD2 506.

In particular, while in the operational mode the anti-arcing circuit is reset (block 710). The reset enables switching to operational power supply for the device and/or sets up the circuit for detection of a disconnection. As shown in FIG. 7, this may involve turning both MOSFETs Q1 508 and Q2 510 off (e.g., G1=0, G2=0). Then a delay is again applied (block 712) and another monitor pulse is sent (block 714), this time through the current path and components associated with CD2 506. After the monitor "high signal" is sent, a check for current through the circuit is made (block 716). In the operational mode, the check for current is made with respect to CD2 506. In particular, a determination may be made regarding whether the output of the comparator 520 is low or high. If the output is high, this indicates that current is flowing through R2 522 and the connector 514 is connected to the device. If the output is low, there is no current flow across R2 522. This is indicative of a disconnection and may cause the anti-arcing circuit to initiate a change back to detection mode.

As long as the output of the comparator 520 is high (e.g., CD2=1), the circuit remains in operational mode. As shown in FIG. 7, the procedure 700 may return to block 714 and send repeated monitoring continuous high signals. Here, operational power continues to be supplied until a disconnection is detected at block 716 (e.g., CD2=0). In response to the disconnection, operational power is cutoff and the procedure 700 returns to block 702. Both MOFSETs are again turned off to initiate the circuit in detection mode. Now, the anti-arcing system is once again set-up to suppress power supply and perform operations to detect subsequent connection of the connector 514 to a device.

A noted above, R1 518 may be configured with relatively high resistance on the order of ten-thousand kilohms or more. In detection mode, a relatively small current (e.g., less than a couple of milliamp) flows through R1 518 when Q1 508 is turned on and the power adapter is connected to a device. Thus, current may be detected using a monitor pulse (e.g., a one millisecond pulse) as discussed above. When current flows there is a voltage drop across R1 and CD1 is pulled high. In response, Q1 508 is shutoff and after a designated delay (e.g., 1 second) Q2 510 is turned on Q2 to enable supply of operational power. R2 522 is configured with relatively low resistance on the order a few milliohms. The relatively low resistance is selected to enable delivery of high current to the device without significant loss of power due to the resistance of R2 522. As long as current flows across R2, Q2 is remains on to deliver operational power in the operational mode. In response to detecting lack of current flow across R2, the circuit turns Q2 off and switches back to detection mode, which suppresses the power supply to the device.

Accordingly, when an attempt to connect a connector 514 to a device is made, the anti-arcing circuit is in detection mode and suppresses power. Monitor pulses may be employed to make sure the connector 514 is actually connected before operational power is sent to the device. The brief monitor pulses of one millisecond or so are not sufficient to sustain arcing. Further, operational power is not supplied until the connection is established and is cutoff upon disconnection. In this manner, arcing may be substantially mitigated and/or eliminated completely.

Having considered the foregoing example details and procedures, consider now a discussion of an example system and device to implement various aspects in accordance with one or more embodiments.

Example System and Device

Figure 8:
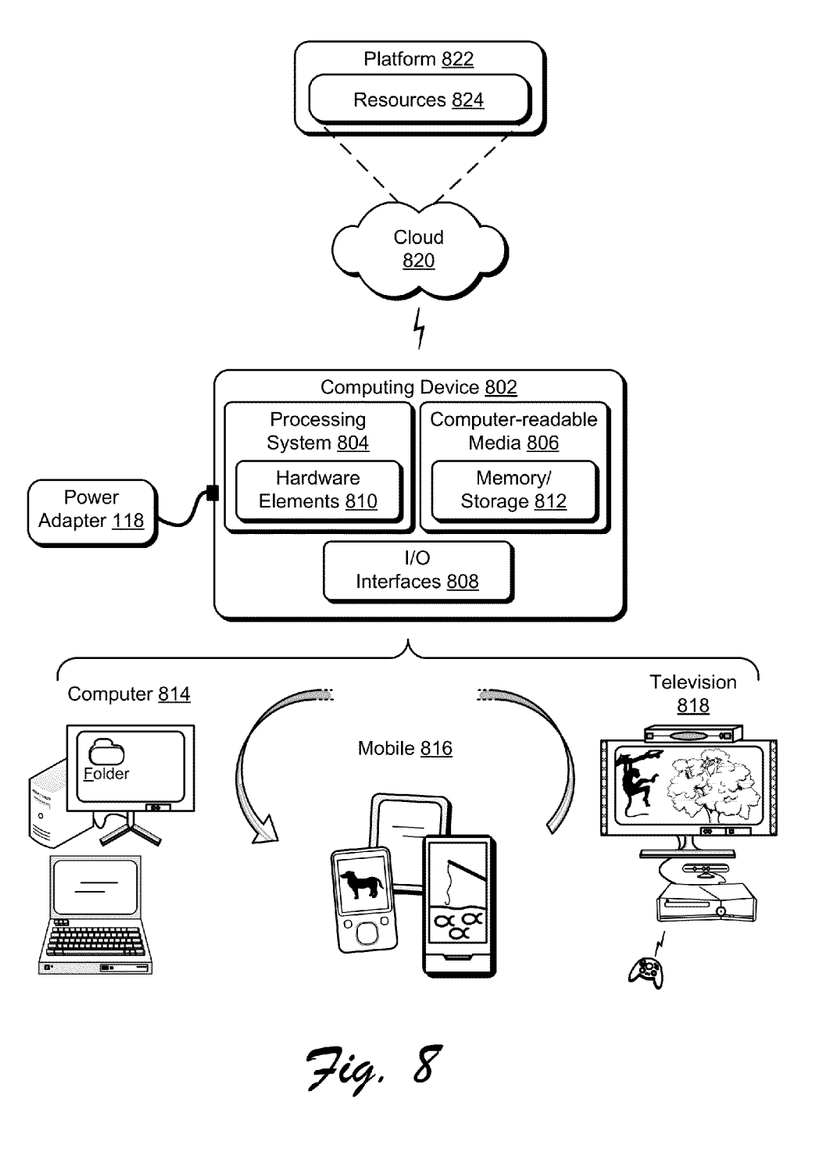
FIG. 8 depicts an example computing system and devices in accordance with one or more embodiments.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable media described previously.

Combinations of the foregoing may also be employed to implement various techniques and modules described herein. Accordingly, software, hardware, or program modules including operating system 110, applications 112, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. The functionality of various modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A power adapter comprising:
   a connector connectable to a client device; and
   an anti-arcing circuit configured to mitigate arcing during connection and disconnection of the connector to the client device by:
      operating in a detection mode using a first current path associated with the detection mode that suppresses power supplied to the client device from a power source via the power adapter;
      monitoring to determine when a connection of the connector to the client device is established; and
      in response to a determination that the connection of the connector to the client device is established, switching to an operational mode to supply a power level sufficient for operations of the client device using a second current path associated with the operational mode.

2. The power adapter as described in claim 1, wherein the connector comprises a five pin connector that provides both a power coupling for supplying power from the power adapter to the client device and a communicative coupling to carry communications between the power adapter and the client device.

3. The power adapter as described in claim 1, wherein the anti-arcing circuit is configured to mitigate arcing without having dedicated detection pins associated with the connector.

4. The power adapter as described in claim 1, wherein the anti-arcing circuit includes a microcontroller to implement logic for monitoring connection of the connector and selectively switching between the first current path associated with the detection mode and the second current path associated with the operational mode.

5. The power adapter as described in claim 1, wherein the first current path includes a first resistor and the second current path include a second resistor, the first resistor having a resistance to cause the suppression of the power supplied to the client device from the power source in the detection mode and the second resistor having a resistance that is lower than the resistance of the first resistor to enable delivery of the power level sufficient for operations of the client device in the operational mode without substantial loss of power.

6. The power adapter as described in claim 1, wherein each said current path comprises a respective current detector having a comparator and a resistor and a metal-oxide-semiconductor field-effect transistor (MOSFET).

7. The power adapter as described in claim 1, wherein the monitoring to determine when the connection is established comprises sending out a monitor pulse and checking for current associated with a current path formed when the connector is connected to the client device.

8. The power adapter as described in claim 1, wherein the anti-arcing circuit further comprises a monitor integrated circuit configured to implement logic for monitoring the connection of the connector and switching between the detection mode and the operational mode.

9. The power adapter as described in claim 1, wherein the anti-arcing circuit is further configured to switch back to the detection mode from the operational mode responsive to detecting that the connector is disconnected from the client device based upon detection of lack of current flow through a current detector associated with the operational mode.

10. The power adapter as described in claim 1, wherein:
the anti-arcing circuit includes components that form different respective current paths with the connector that are associated with the detection mode and the operational mode; and
the anti-arcing circuit is configured to selectively turn particular components in the different said current paths on and off to control switching between the operational mode and the detection mode.

11. A method implemented by an anti-arcing circuit for a power supply unit to mitigate arcing comprising:
initiating the power supply unit in a detection mode that restricts power supplied to a client device via a first current path associated with the detection mode;
monitoring to detect a connection of the power supply unit to an interface of the client device; and
operating the power supply unit in an operational mode to supply power to the client device responsive to detection of the connection to the interface via a second current path associated with the operational mode.

12. A method as described in claim 11, further comprising:
monitoring to detect a disconnection of the power supply unit to the interface of the client device; and upon disconnection of the power supply unit, switching back to the detection mode.

13. A method as described in claim 11, wherein monitoring to detect the connection of the power supply unit further comprises:
sending a pulsed current to an input of a current detector included in the anti-arcing circuit; and
checking whether the current flows through to an output of the current detector, wherein detection of current at the output of the current detector indicates a connection of the power supply unit to the interface of the client device and causes a switch to the operational mode.

14. A method as described in claim 11, wherein:
the detection mode is associated with a first current path having a first resistor with a resistance sufficient to cause the restriction of power; and
the operational mode is associated with a second current path having a second resistor with a resistance that enables delivery of power to the client device from the power source without substantial restriction.

15. A method as described in claim 11, wherein the anti-arcing circuit is implemented as a component of the power adapter.

16. A method as described in claim 11, wherein the anti-arcing circuit is implemented as a component of the client device.

17. An anti-arcing circuit for a power adapter comprising:
a first current path for a detection mode between a power source and a connector of the power adapter to restrict power from the power source when the connector is disconnected from a client device;
a second current path for an operational mode between the power source and the connector to provide an operational power level for the client device when the connector is connected to the client device; and
a hardware element to implement logic for monitoring connection of the connector to the client device and selectively switch between the first current path and second path to mitigate arcing, including checking whether or not the connector is connected to the client device by sending monitor pulses through the first current path and by sending a high signal through the second current path.

18. The anti-arcing circuit as recited claim 17, wherein:
the first current path comprises a first current detector and a first metal-oxide-semiconductor field-effect transistor (MOSFET) to implement the detection mode;
the second current path comprises a second current detector and a second metal-oxide-semiconductor field-effect transistor (MOSFET) to implement the operational mode; and
the hardware element is configured to selectively turn the first MOFSET and the second MOFSET on and off to switch between the detection mode and the operational mode.

19. The anti-arcing circuit as recited claim 18, wherein:
the first current detector includes a first resistor with a resistance sufficient to cause the restriction of power; and
the second current detector includes a second resistor with a resistance that enables delivery of power to the client device from the power source without substantial restriction.

20. The anti-arcing circuit as recited in claim 19, wherein the hardware element comprises a microcontroller device.

* * * * *